Dec. 14, 1954 S. W. OTTO ET AL 2,696,742
FLUSH PIN CONVEYER CHAIN
Filed July 13, 1949 2 Sheets-Sheet 1
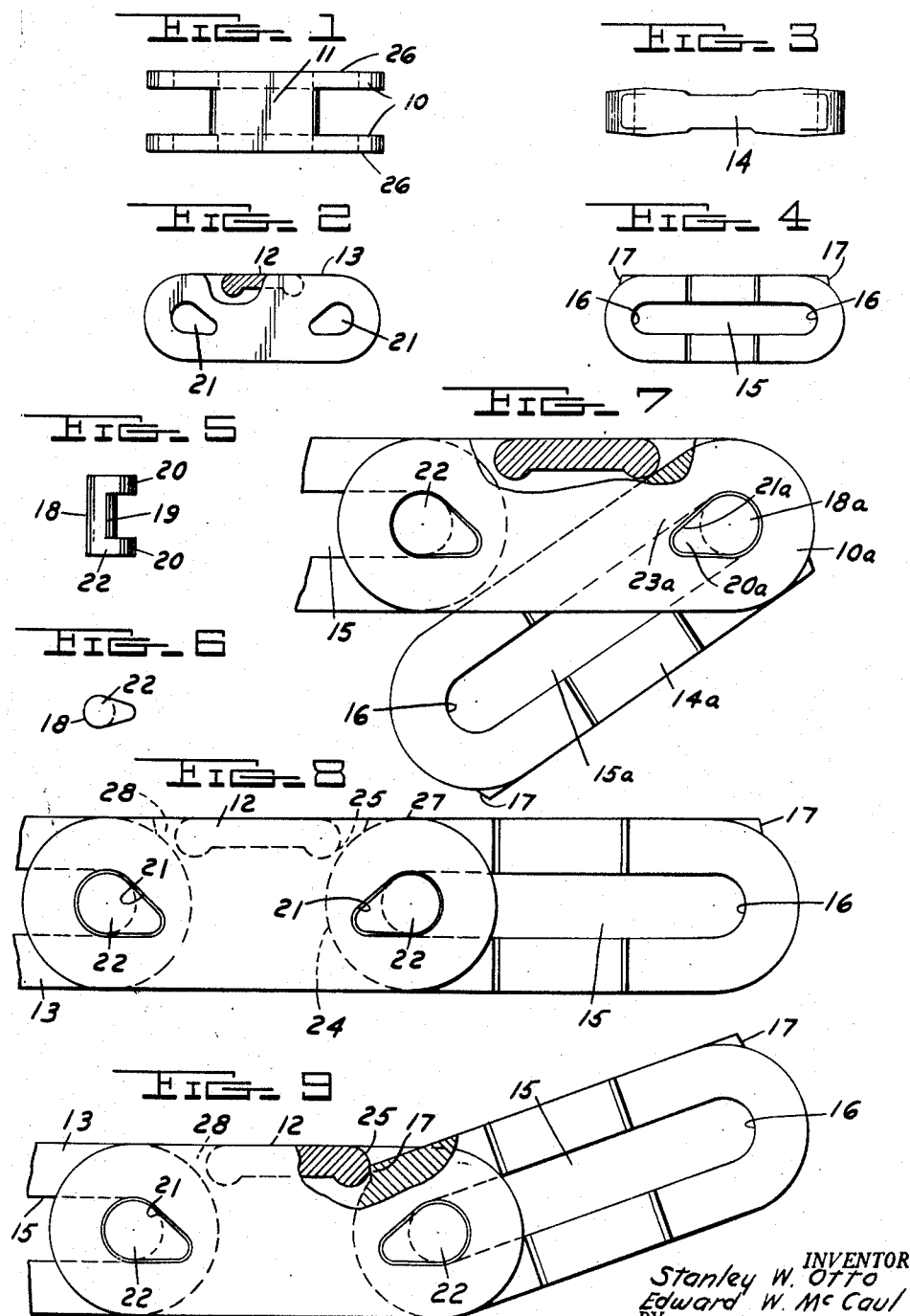
INVENTOR.
Stanley W. Otto
Edward W. McCaul
BY
Harley, Forster & Harley
ATTORNEYS Dec. 14, 1954 S. W. OTTO ET AL 2,696,742
FLUSH PIN CONVEYER CHAIN
Filed July 13, 1949 2 Sheets-Sheet 2
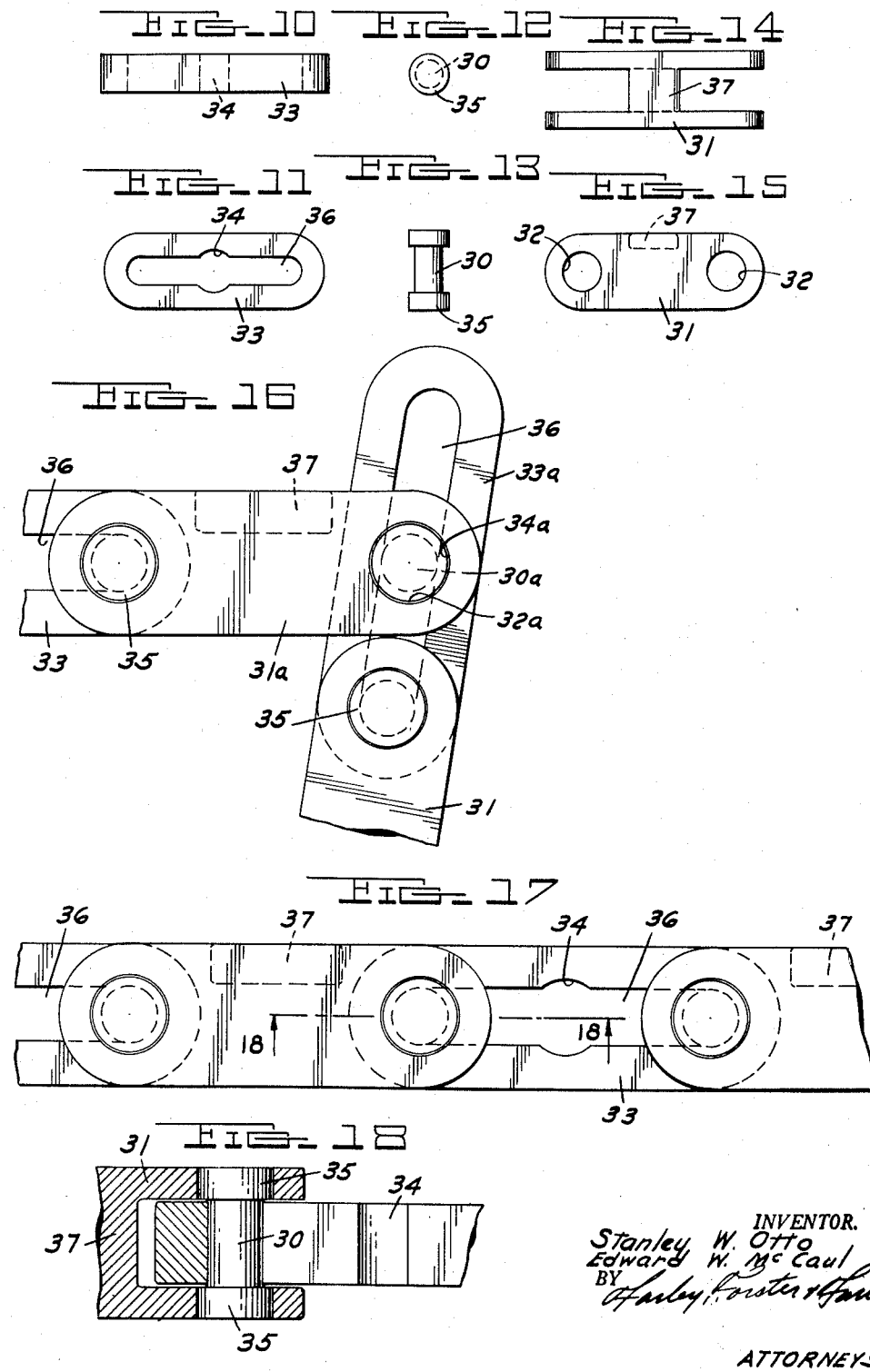
INVENTOR.
Stanley W. Otto
Edward W. McCaul
BY
ATTORNEYS

United States Patent Office 2,696,742
Patented Dec. 14, 1954

2,696,742

FLUSH PIN CONVEYER CHAIN

Stanley W. Otto, Detroit, and Edward Wayland McCaul, Birmingham, Mich., assignors to Jervis B. Webb Company, Detroit, Mich., a corporation of Michigan Application July 13, 1949, Serial No. 104,512

13 Claims. (Cl. 74—254)

This invention relates to a conveyor chain construction of the type wherein center links and side bar elements are pivotally assembled by removable connecting pins and more particularly to a chain of this type wherein a pair of side bar elements are held in rigid relationship by an integral cross member joining such side bar elements.

Conveyor chains of this general type which employ center links having longitudinally slotted openings have heretofore been assembled by connecting pins having heads riveted over after assembly with the respective side bars and center link elements. Such riveted construction is objectionable from a number of standpoints including the excessive time of assembly, the inconvenience of riveting during installation of the chain, the difficulty of replacing worn or damaged links as well as the projection of the rivet heads beyond the face of the side bars, making it difficult for the chain to pass around guide rollers contacting such heads.

It is the principal object of the present invention to provide a chain construction of the general type described above wherein the locking pin may be readily assembled and removed when the chain links are doubled over to an inoperative position and wherein the locking pin will be locked in position whenever the links are within the operative range of articulation.

Another object is to provide a construction wherein the ends of the locking pin are flush with the outer surfaces of the side bar elements.

Another object is to provide a chain construction wherein all elements are susceptible to manufacture by economical forging processes with very slight, if any, requirements for machining.

Another object is to provide a chain of this construction wherein articulation in one direction may be accommodated to an extent as high as a 90° relationship between adjacent chain links and wherein articulation in an opposite direction to an extent on the order of a 20° departure from a straight line may be accommodated without any danger or possibility of the locking pin becoming disengaged.

Another object is to provide a chain construction of this general type suitable for use as a drag chain wherein the upper face of the chain provides a substantially continuous surface with minimum openings or no openings for catching or receiving foreign objects which might cause jamming or damage to the chain in rounding the sprocket members.

Another object is to provide a chain of this type wherein the side faces provide a substantially smooth continuous surface adaptable for use in passing around guide rollers without any projections which might induce catching, bumping, chattering or high-wear points.

These and other objects will be more apparent from the following detailed description of two particular embodiments of our invention and from an examination of the drawings forming a part hereof wherein Fig. 1 is a plan view of a double side bar link;
Fig. 2 is a side elevation of such link;
Fig. 3 is a plan view of the center link;
Fig. 4 is a side elevation of such link;
Fig. 5 is a plan view of the locking pin;
Fig. 6 is a side elevation or end view of such pin;
Fig. 7 is a side elevation of the several elements in assembled relation, showing the relative position of the side bar and center link required for assembly and disassembly;

Fig. 8 is a side elevation of the links of the chain when extended to a straight position;
Fig. 9 is a side elevation of the links showing the limit of articulation in a direction opposite to that required in passing around the sprocket member not shown;
Fig. 10 is a plan view of the center link employed in a modified construction;
Fig. 11 is a side elevation of such center link;
Fig. 12 is a side elevation or end view of the locking pin employed in such modified construction;
Fig. 13 is a plan view of such locking pin;
Fig. 14 is a plan view of the double side bar link employed in the modified construction;
Fig. 15 is a side elevation of such side bar link;
Fig. 16 is an assembly view showing the respective modified elements in a position for assembly or disassembly of the locking pins;
Fig. 17 is an assembly view of the modified chain in operative position; and
Fig. 18 is a sectional view taken along the line 18—18 of Fig. 17.

With reference to the first embodiment of Figs. 1-9, the double side bar link, best shown in Figs. 1 and 2, comprises a pair of side bar elements 10 joined in rigid relationship by an integral connecting bridge member 11, the upper surface 12 of which is flush with the upper surfaces 13 of the side bar elements 10. As shown in Figs. 3 and 4, the center link 14 has a slotted opening 15 terminating in arcuate ends 16 providing seats for connecting pins 18 and is symmetrical with the exception that such link has provided on one edge projecting lugs 17, the function of which will be presently described.

The connecting pin 18 is provided with a central cylindrical section 19 and at either end with lugs 20 projecting out from the cylindrical body 19. The cylindrical section 19 between the lugs 20 has a radius substantially equal to the arcuate ends 16 of the center link while the distance between the lugs 20 is but slightly greater than the width of the end portions of such center link. Each of the side bars 10 is provided at either end with irregular apertures 21 corresponding in configuration with the end 22 of the locking pin 18 and dimensioned to provide clearance for the insertion of such connecting pins.

In Fig. 7 the center link 14a is shown in the position required for insertion or disassembly of a locking pin 18a. It will be seen that in this position, the projection or lug 20a is in alignment with the slotted opening 15a in the center link 14a as well as with the aperture 21a in the side bars 10a. It will be understood that when the locking pin 20a has been centered with the lugs 20a seated in the respective side bars 10a, the center link 14a may be rotated to any operative position such as shown in Figs. 8 and 9. It will also be seen that as soon as the link 14a is rotated a few degrees from the position shown in Fig. 7, the lugs 20a will begin to project over the body portion 23a of the center link making it impossible for the connecting pin to move in either direction away from its operative position.

As best seen in Fig. 8, the arcuate end 24 of the center link will, for all operative positions of the chain, be in close proximity to the edge 25 of the central bridge member 11, preventing any telescoping movement which might otherwise permit a pin disengaging position to be reached. Furthermore, any collapsing of the chain after passing the horizontal position as in Fig. 9 is prevented by the engagement of the projection 17 with the edge 25 limiting the upward articulation to an angle less than that which would permit the center link to slide past the edge 25. Thus for all positions of the center link from a few degrees past that shown in Fig. 7 to the upper limit of its pivotal movement shown in Fig. 9, the pin 18 is locked in position against any possible disengagement.

Since the length of the pin 18 is made equal to the overall width of the side bar link, the ends of the pin will be flush with the outer surfaces 26 of such side bar, and there are accordingly no projections beyond such outer faces which would interfere with the use of back-up rollers permitting the chain to make a gradual turn in a horizontal plane.

A substantially continuous top surface is presented, the only opening being that indicated at 28, so that it would be difficult for any foreign object to enter from the top and become lodged between adjacent links.

In Figs. 10 through 18 a modified construction is shown employing a symmetrical circular headed locking pin 30, side bars 31 with circular apertures 32 and a symmetrical center link 33 recessed at the center 34 to permit passage of the head 35 of a locking pin 30. As may be seen in Fig. 16, a locking pin 30a may be assembled or disassembled with a center link 33a and side bars 31a when the recessed portion 34a in the center link 33a is aligned with the circular apertures 32a in the side bars 31a, the heads 35 of the locking pin being slightly smaller than such recess and apertures and the shank portion of the locking pin being adapted to pass within the slotted opening 36.

Inasmuch as any collapsing movement of the center link when the chain is in the horizontal position shown in Fig. 17 is prevented by the cross bridge 37 and inasmuch as any collapsing movement sufficient to permit disengagement of the locking pin is extremely unlikely, there is no necessity for limiting articulation of the chain as in the first embodiment.

While two particular embodiments of our invention have been described herein in detail, it will be understood that various modifications might be resorted to without departing from the scope of our invention as defined in the following claims.

We claim:

1. A chain comprising a plurality of center link elements, overlapping, opposed, rigidly-connected, double side bar elements and interengaging, removable, connecting pins, interengaging surfaces being integrally construted on said elements per se for locking said connecting pins against removal throughout any operative range of articulation of said chain, clearance means being provided to accommodate removal of any of said connecting pins only upon relative pivotal articulation of said center link elements and side bar elements to an inoperative position.

2. A chain comprising a plurality of center link elements, overlapping, opposed, rigidly-connected, double side bar elements and interengaging, removable, connecting pins, each pin having a central portion, co-extensive with each center link element, and headed ends, apertures in each double side bar element adapted to accommodate the insertion and seating of said headed ends, and an aperture in each center link element adapted to accommodate the insertion and retraction of said headed ends only when said center link elements and side bar elements are moved to an inoperative relative position.

3. A chain comprising a plurality of center link elements, overlapping, opposed, rigidly-connected, double side bar elements and interengaging, removable, connecting pins, each center link element having a longitudinal slot terminating in arcuate ends, each end forming a seat for one pin, each pin having projections at its ends required to be aligned with said slot for insertion therethrough, and apertures in each double side bar element adapted to accommodate said projections and confine said pin against rotation relative to said side bar element.

4. A chain as set forth in claim 3 wherein the rigid connection between each opposed pair of side bars is adapted to cooperate with a portion of each center link element to limit the relative articulation therebetween in one direction to a position short of alignment between said slot in said center link element and the projections in said pin, the aligned position in the opposite direction being an inoperative position for the respective elements.

5. A chain as set forth in claim 3 wherein the connecting pin is provided with a substantially cylindrical central portion co-extensive with the thickness of said center link element and wherein the ends of said connecting pin are provided with projecting lugs required to be aligned with the slotted opening in said center link element for insertion therethrough.

6. A chain as set forth in claim 3 wherein the ends of said connecting pin are adapted to lie flush with the outer surfaces of said side bar elements when said chain is assembled.

7. A chain comprising a plurality of center link elements, overlapping, opposed, double side bar elements and interengaging, connecting pins, each pair of opposed side bars being rigidly connected by a bridge member extending between outer edges of said side bars, each end of each center link element being accommodated between the opposed ends of one double side bar element, apertures extending through said side bar and center link elements for accommodating said connecting pins, and projecting surfaces in said center link element adapted to contact said bridge member and limit the relative rotation between said side bar and center link elements in one direction.

8. A chain as set forth in claim 7 wherein a slotted opening is provided in each center link element having arcuate ends each adapted to provide a seat for one connecting pin, a substantially cylindrical portion in such connecting pin substantially co-extensive with the width of said center link element, and heads on said connecting pin capable of insertion through said slotted opening only when aligned therewith, apertures in said side bar elements for receiving the heads of said connecting pin preventing relative rotation between said connecting pin and associated side bar elements.

9. A chain comprising a plurality of center link elements, overlapping, opposed, rigidly-connected, double side bar elements and interengaging, removable, connecting pins, each center link element having a longitudinal slot terminating in arcuate ends each forming a seat for one pin, each pin having circular headed ends of greater diameter than the width of said slot, said slot having a limited section spaced from its ends enlarged to permit the passage of one of said heads, and apertures in said side bar elements adapted to seat said circular heads.

10. A chain as set forth in claim 9 wherein each connecting pin is provided with a substantially cylindrical central portion co-extensive in length with the thickness of said center link element.

11. A chain as set forth in claim 9 wherein each connecting pin is provided with a substantially cylindrical central portion co-extensive in length with the thickness of said center link element, and wherein the end to end length of each connecting pin is substantially equal to the composite width of a double side bar element.

12. A chain comprising a plurality of center chain link elements, overlapping, opposed, integrally-connected, double side bar links, and interengaging, removable, connecting pins, each connecting pin having shoulder surfaces adapted to laterally oppose chain link surfaces throughout operating articulation of said chain, and apertures in said chain links adapted to laterally pass said connecting pin shoulders when the assembled chain links are moved to a position not encountered in operation.

13. A chain comprising a plurality of center link elements, overlapping, opposed, rigidly-connected, double side bar elements and interengaging, removable, connecting pins, distinctive aligned apertures in the overlapping portions of said center link elements and side bar elements for seating each connecting pin during normal articulation of said chain, shoulders on said connecting pin adapted to laterally oppose distinctive terminal edges defining said aligned apertures to prevent disengagement of said connecting pin during said normal articulation, said side and center link elements being movable to a position not encountered in operation for the assembly and disassembly of said connecting pin, the aligned apertures in said center link and side bar elements when in said latter position forming a composite opening adapted to pass the shoulder portions of said connecting pin.

References Cited in the file of this patent

UNITED STATES PATENTS

| Number | Name | Date |
|---|---|---|
| Re. 11,571 | Baldwin | Sept. 29, 1896 |
| Re. 22,380 | Hollmann et al. | Sept. 28, 1943 |
| 870,704 | Weston | Nov. 12, 1907 |
| 1,402,766 | Hay | Jan. 10, 1922 |
| 2,068,808 | Levin | Jan. 26, 1937 |
| 2,068,862 | Lee | Jan. 26, 1937 |
| 2,411,171 | Simmons | Nov. 19, 1946 |